US005944959A

United States Patent [19]

Wywialowski

[11] Patent Number: 5,944,959

[45] Date of Patent: Aug. 31, 1999

[54] INTEGRAL OUTBOARD BEARING SUPPORT FOR DOCTOR OSCILLATOR

[75] Inventor: Frank J. Wywialowski, Beloit, Wis.

[73] Assignee: Beloit Technologies, Inc., Wilmington, Del.

[21] Appl. No.: 08/911,447

[22] Filed: Aug. 14, 1997

[51] Int. Cl.[6] .............................. B31F 1/12; D21F 11/00; F16C 35/00; F16H 57/02

[52] U.S. Cl. .......................... 162/281; 162/272; 162/280; 384/428; 384/438; 74/606 R; 74/15.4; 74/25; 74/44; 74/421 A; 74/570

[58] Field of Search ................................ 74/606 R, 15.4, 74/25, 44, 421 A, 570; 118/413; 162/280, 281, 272; 384/428, 438; 417/415

[56] References Cited

U.S. PATENT DOCUMENTS

| | | | |
|---|---|---|---|
| 2,245,078 | 6/1941 | Padgett | 74/607 |
| 2,675,759 | 4/1954 | Yarger | 417/415 |
| 3,853,694 | 12/1974 | Parker | 162/216 |
| 4,272,317 | 6/1981 | Roerig | 162/272 |
| 4,287,778 | 9/1981 | Quick | 74/15.4 |
| 4,440,291 | 4/1984 | Brems | 198/488 |
| 5,507,917 | 4/1996 | Didier | 162/281 |

OTHER PUBLICATIONS

John E. Miller, The Reciprocating Pump—Theory, Design, and Use, by John Wiley & Sons, Inc, p. 32, 1987.

*Primary Examiner*—Peter Chin
*Assistant Examiner*—Dionne A. Walls
*Attorney, Agent, or Firm*—Lathrop & Clark LLP; Raymond W. Campbell; Gerald A. Mathews

[57] ABSTRACT

An integral outboard bearing support for a gear reducer on a papermaking machine oscillating doctor. The bearing support rotatably supports a distal end of the gear reducer's drive shaft to reduce deflection and fatigue. The outboard support also aligns internal bearing supports with the outboard support to optimize performance by preventing current reducer shaft and support bearing failures.

9 Claims, 8 Drawing Sheets

INTEGRAL OUTBOARD BEARING SUPPORT FOR DOCTOR OSCILLATOR

FIELD OF THE INVENTION

This invention relates generally to drive mechanisms for oscillating doctors in papermaking machines, and more particularly to an integral outboard bearing support for a gear reducer output shaft that reduces shaft deflection and wear, while providing extremely long support bearing life.

BACKGROUND OF THE INVENTION

In available gear reducers used for papermaking machine doctor oscillator applications, output drive shafts are supported only by inboard bearing supports, which provide limited life due to high fatigue stresses that result from high cyclic bending moments on the drive shaft. Existing gear reducer output shaft support bearings and caps are not designed for high overhang push/pull forces. Further, with existing "overhang" output shaft gear reducers, the net doctor stroke is reduced by drive shaft deflection. Gear reducers with their drive shafts supported outboard of the eccentric mounting currently are not available.

SUMMARY OF THE INVENTION

The present invention overcomes deficiencies in prior art output drive mechanisms by adding bearing support to a distal end of a gear reducer drive shaft. The support comes from an integral gear head pilot mounted support which concentrically aligns the outboard support bearing with the gear head's internal support bearing. Alignment is maintained within very close concentric tolerances because the output bearing support and the support for internal bearing is provided by an integral outboard bearing support machined at one machine setup.

An integral outboard bearing support for accomplishing this objective includes: a housing having a first side and a second side; a bore in the first side for receiving a pilot fit portion of a gear reducer or gearhead; a recess in the second side for receiving the distal end of a gearhead output shaft; and a cavity for receiving a proximal portion of the output shaft and an eccentric; and a connecting arm cavity. There is preferably a bearing positioned in the recess to reduce friction between the housing and the output shaft. With this arrangement, gearhead output shafts experience minimal stress and fatigue and gearhead failures will be greatly reduced.

It is a feature of the present invention to provide a bearing support which rotatably supports a drive shaft for reduced deflection and fatigue.

It is another feature of the present invention to provide a bearing support for a papermaking doctor oscillator output shaft which optimizes performance and reduces failures.

Further objects, features and advantages of the invention will be apparent from the following detailed description when taken in conjunction with the accompanying drawings.

DESCRIPTION OF THE PREFERRED EMBODIMENT

Figure 1:
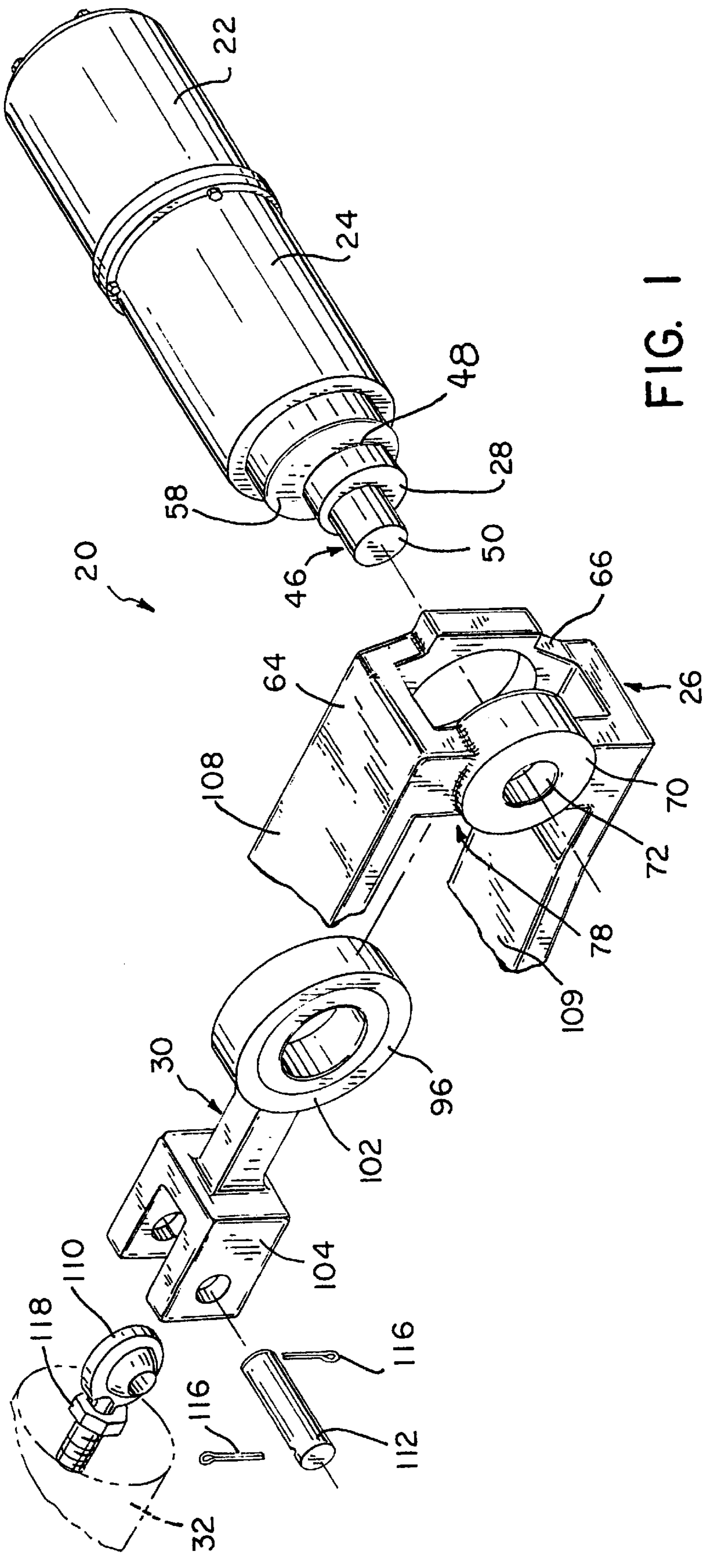
FIG. 1 is an exploded perspective view of a doctor oscillator drive train in accordance with the present invention.
Figure 2:
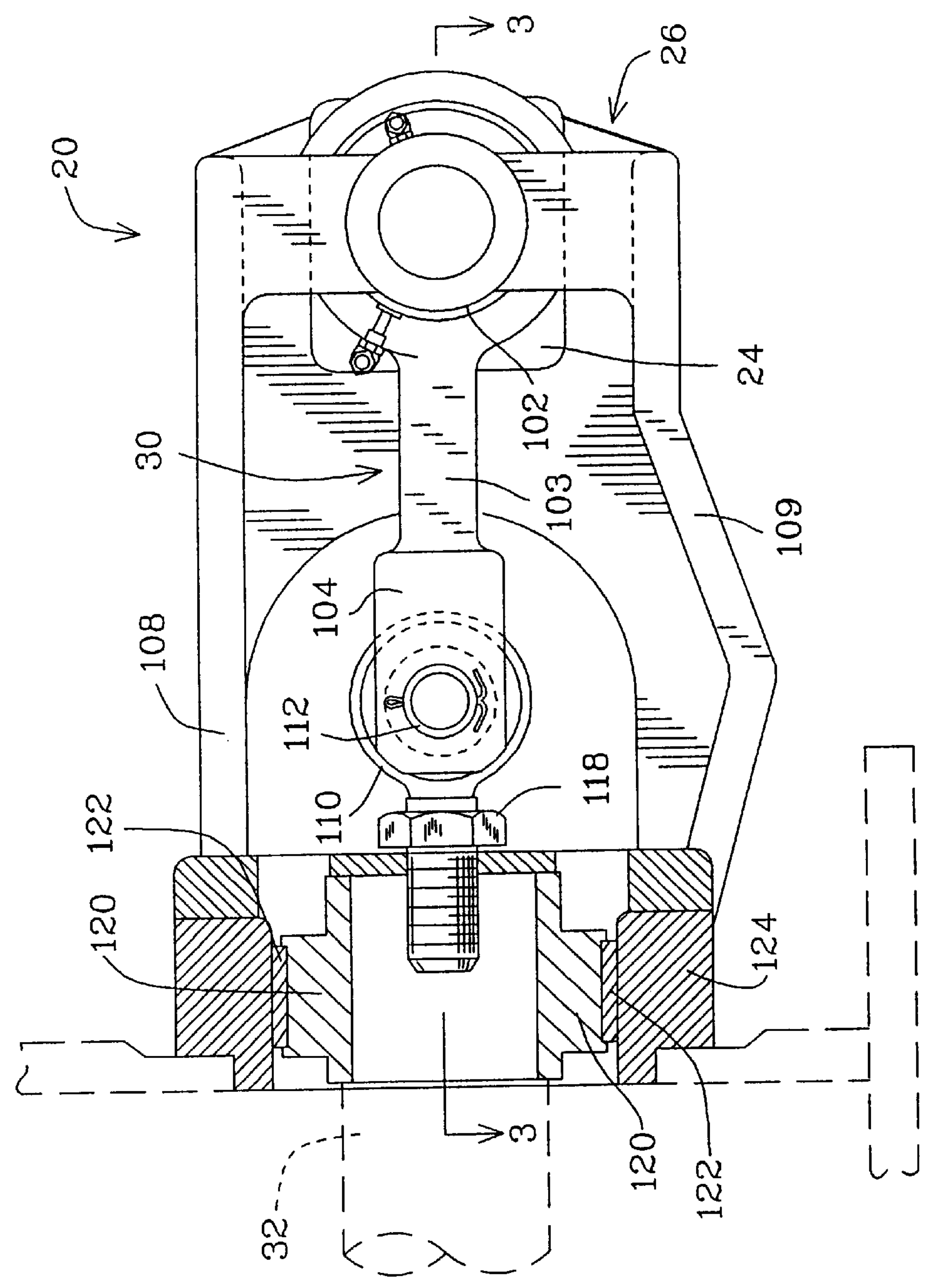
FIG. 2 is a side view of an outboard bearing support and a related connecting arm.
Figure 3:
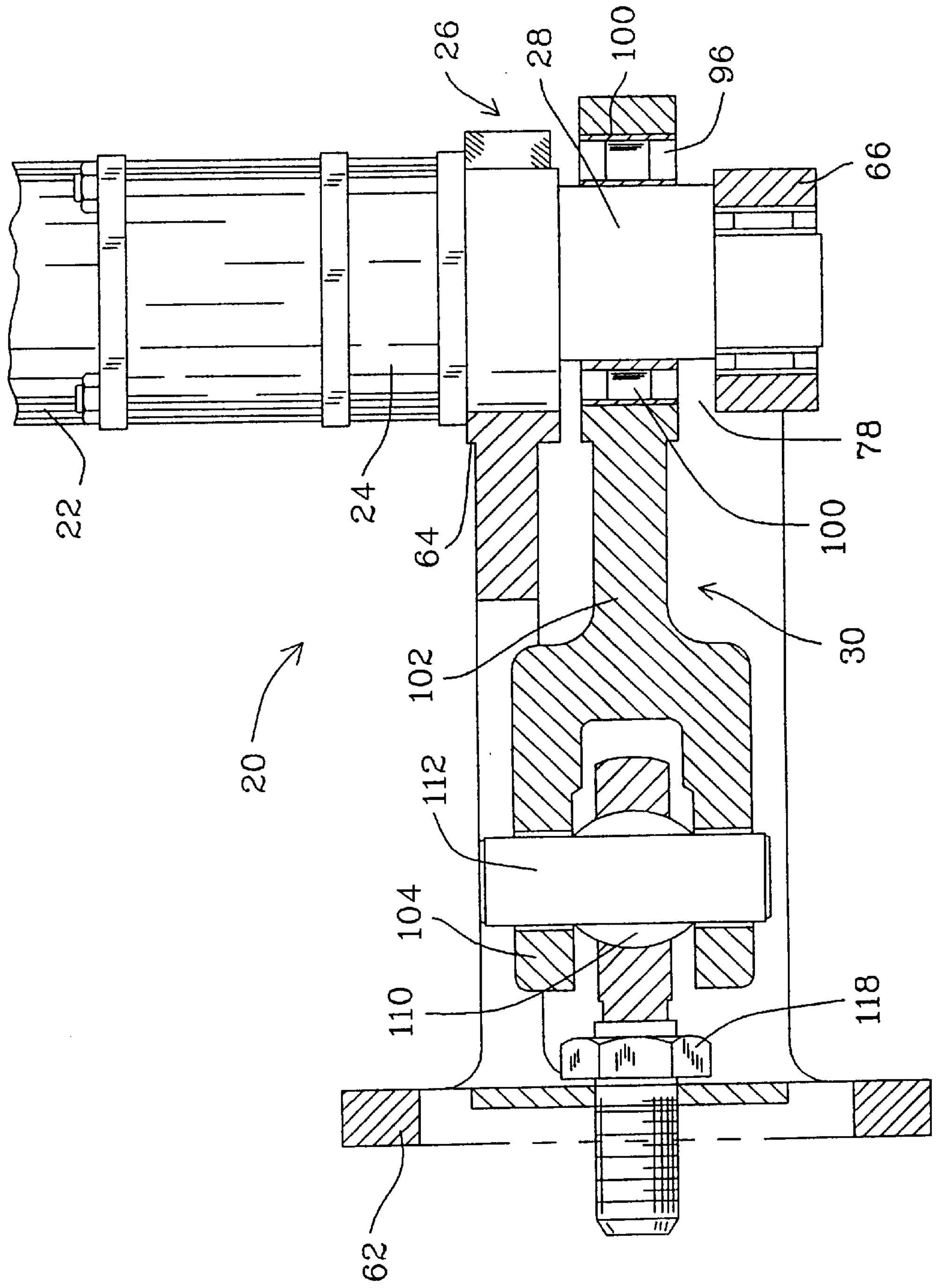
FIG. 3 is a cross-sectional plan view of the outboard bearing support of FIG. 2 taken along section line 3—3.

To the extent practical, the same reference numerals will be used to identify the same or similar elements in each of the described drawings. Depicted generally in FIGS. 1, 2, and 3, is a drive mechanism 20 including; a motor 22, a gearhead 24, an integral outboard bearing support 26, an eccentric 28, a connecting arm 30, and a doctor back journal 32. The motor 22 is preferably electric and has a rotational output of relatively high rpm. The motor 22 also includes a conduit box 38, shown in FIG. 4. Also preferably, the motor is a 1⁄10 horsepower Leeson brand with electric "Washguard" motor having a specified rotational speed 1,725 rpm. Motor 22 preferably has an output shaft (not illustrated) that is oriented perpendicular to the direction in which the doctor back oscillates.

The gearhead 24 (or "gear reducer") is meshed or otherwise fixed to the output motor shaft. The gearhead 24 reduces rotational output speed of the motor 22 before it is translated into oscillating motion in the doctor back. Preferably, the gearhead 24 is a high ratio gearhead such as a Thomson Micron, size 10, 300:1 gearhead. The gearhead 24 includes an extended output shaft 46 having a proximal portion 48 and distal portion 50. Typically, gearheads are provided with an internal support (not illustrated) to resist bending and deflection of an output shaft. However, when the rotational movement of the output shaft is being translated into an oscillating movement perpendicular to the axis of the output shaft the lateral forces can cause excessive bending and deflection of the output shaft and failure of the internal supports. The present invention provides additional outboard support for the output shaft 46 by supporting the distal end 50 with a separate and independent outboard bearing support (described below).

Figure 5:
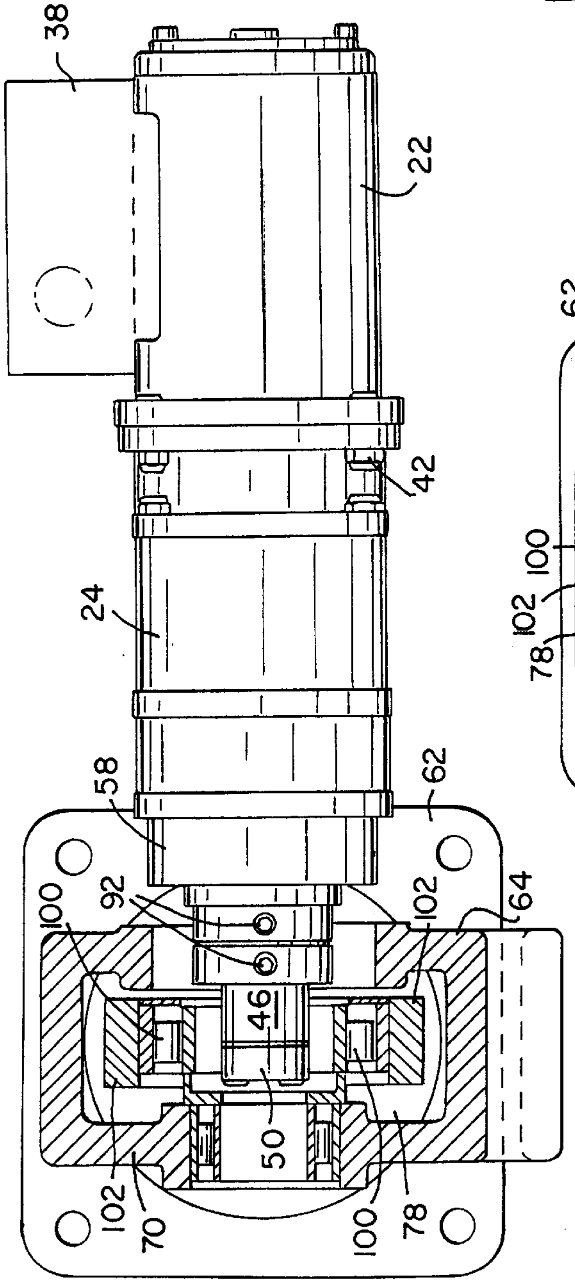
FIG. 5 is a side elevational view, partially broken away in section, of the apparatus of FIG. 4 showing the gearhead partially received within the bearing support.
Figure 6:
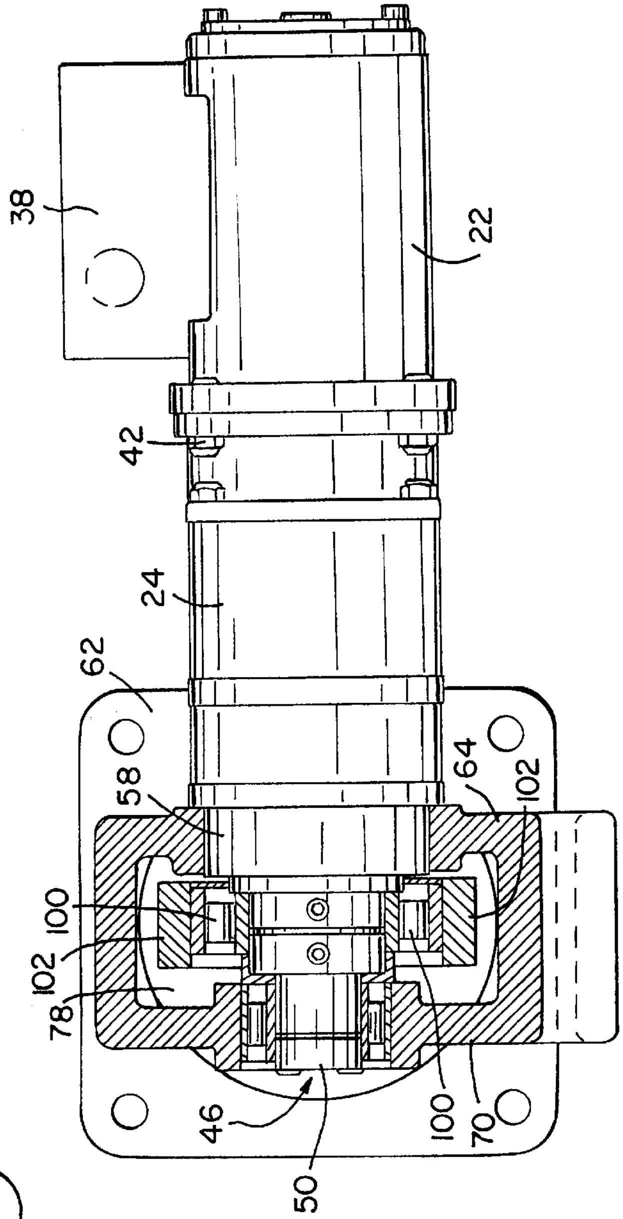
FIG. 6 is a side elevational view, partial broken away in section, of the assembled apparatus of FIGS. 4 and 5.
Figure 7:
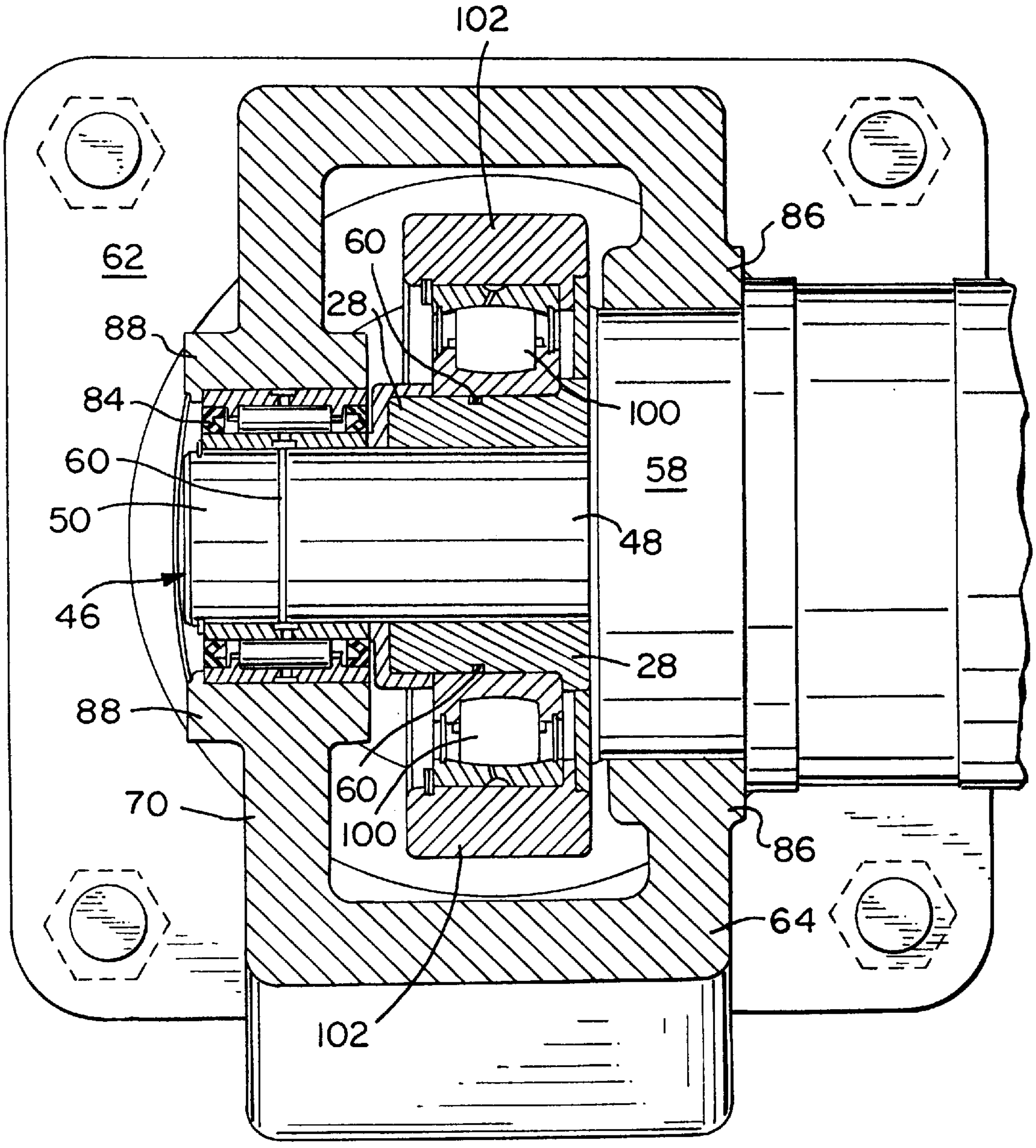
FIG. 7 is an enlarged cross-sectional view of the bearing support of FIG. 6.

The gearhead 24 also includes a pilot fit housing portion 58 that can be supported by a close-tolerance bore 66 for additional stability. Because the motor 22 and the gearhead 24 operate in a wet and corrosive environment, it is desirable that these components be designed and built to withstand wet ambient harsh conditions, as well as dusty hot environments. Appropriate O-rings 60, as shown in FIGS. 4, 5, and 6, are provided to drive the inner races of the bearings.

The gearhead 24 pilot fit housing portion 58 and the distal end 50 of the output shaft 46 are supported by the integral outboard bearing support 26. The support 26 is a housing which simultaneously supports and aligns moving and stationary portions of the gearhead 24 to reduce stress and increase efficiency of the entire doctor back oscillator drive train. The integral outboard bearing support 26 has a mounting plate 62, shown in FIGS. 4, 5, and 6, for securing the bearing support to adjacent machine components. The support 26 has a first side 64 defining a pilot bore 66, a second side 70 defining a recess 72, and a connecting arm cavity 78 defined by the first side 64 and the second side 70. The integral outboard bearing support 26 is preferably made of cast stainless steel to resist corrosion. The bore 66 is preferably a cylindrical hole having a central axis and the recess 72 is also preferably cylindrical having a central axis coaxially aligned with the central axis of the pilot bore 66. Aligning the pilot bore 66 and the recess 72 allows both to be machined at a single machining setup which increases the efficiency of manufacture and accuracy of alignment between the pilot bore 66 and the recess 72. It should be noted that the recess 72 is preferably machined through the outboard bearing support 26 to define a bore, however, it is not necessary to have the recess 72 extend through the outboard bearing support 26 to realize the benefits of the present invention. Thus, as used herein, the term "recess" includes any support surface or shape on the outboard bearing support 26 that defines a bearing location that can rotatably engage the distal end 50 of the output shaft 46 to alleviate or prevent deflection and fatigue of the output shaft 46 during operation. The recess 72 preferably includes a needle bearing 84 for rotatably receiving the distal end 50 of the output shaft 46 to reduce friction between the rotating output shaft 46 and the recess 72. Further, the integral outboard bearing support 26 includes flanges 86 and 88 to reinforce the pilot bore 66 and recess 72, respectively, and reduce stress near these openings.

The pilot bore 66 in the first side 64 of the integral outboard bearing support 26 is designed to receive the pilot fit housing portion 58 of the gearhead 24 to align and provide fixed support for the gearhead 24 to optimize translation of output shaft rotational movement into oscillating movement of the doctor back.

Figure 4:
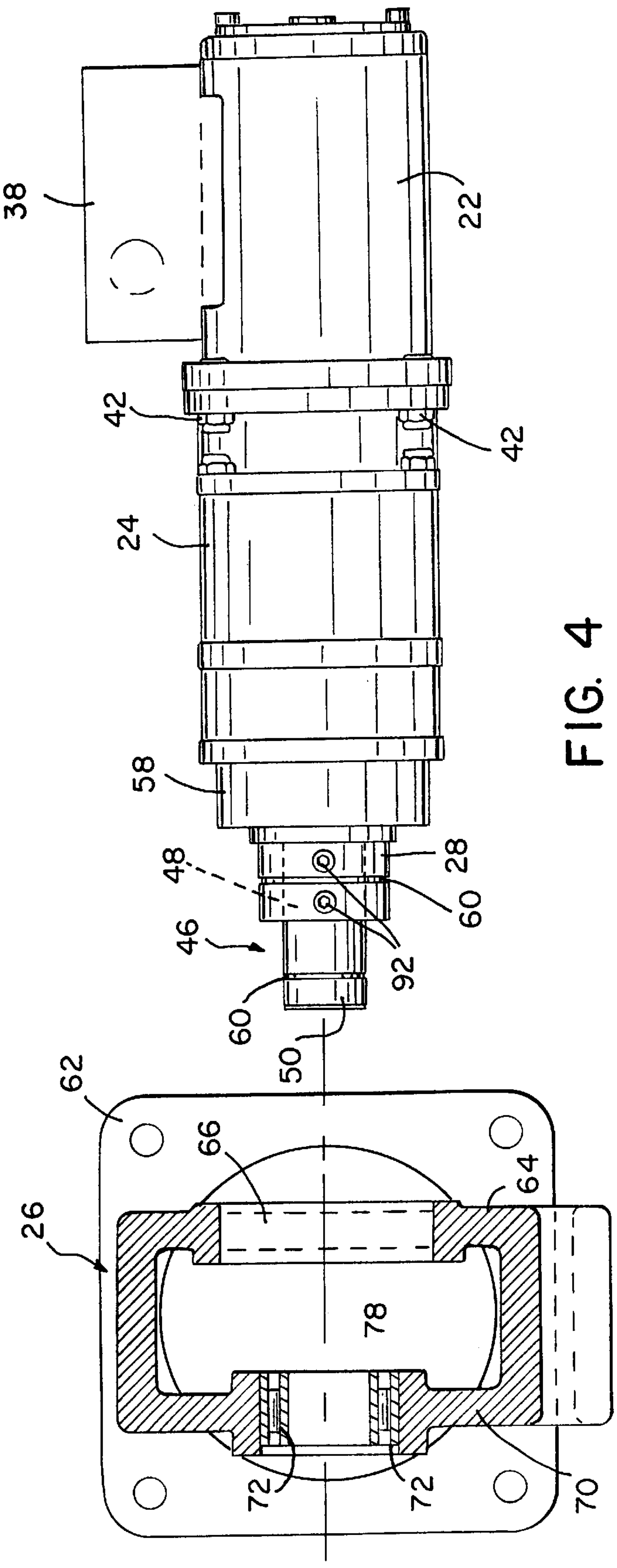
FIG. 4 is a side elevational view of the bearing support broken away in section, and gearhead of FIG. 1 prior to assembly.

As depicted in FIG. 4, the eccentric 28 is disposed over the output shaft 46 and secured to the proximal portion 48 where it is fixed with set screws 92. The eccentric 28 includes a cylindrical bore that is off-center relative to the outer annular surface of the eccentric 28. Thus, when installed on the output shaft 46, the outer annular surface of the eccentric 28 will not be coaxially aligned with the output shaft 46 resulting in the outer annular surface of the eccentric 28 tending to orbit the axis of the output shaft 46. Preferably, the longitudinal axis of the eccentric bore is about ¼ inch offset from the longitudinal axis of the eccentric 28 so that the total oscillating movement of the doctor back is approximately ½ inch.

The connecting arm 30 is connected to the eccentric 28, as depicted in FIGS. 2 and 3. The connecting arm 30 defines, at one end, a bore for receiving the eccentric 28. In the connecting arm eccentric bearing bore 96 are positioned spherical roller bearings 100 to eliminate friction between the rotating eccentric 28 and the oscillating bore of the connecting arm 30.

The gearhead 24 can be assembled into the integral outboard bearing support 26 by first installing the eccentric 28 into the proximal portion 48 of the output shaft 46, as shown in FIG. 4. With the gearhead 24 aligned with the pilot bore 66 and the recess 72, a connecting arm 30 can be partially inserted through the connecting arm cavity 78. Once the connecting arm bore 96 is aligned with the integral outboard bearing support pilot bore 66 and recess 72, the output shaft 46 can be inserted into the pilot bore 66, the cavity 78, and the connecting arm eccentric bearing bore 96, shown in FIG. 5. Finally, the distal end 50 of the output shaft 46 is inserted into the recess 72, the eccentric 28 is inserted into the spherical roller bearing 100, which is mounted in the connecting arm bearing bore 96, and the pilot fit housing portion 58 is installed into the pilot bore 66 simultaneously. The resulting engagement between the gearhead 24 and the integral outboard transport 26 provides support for the output shaft 46 and virtually eliminates output shaft fatigue and stresses while providing extremely long shaft support bearing operating life.

The connecting arm 30 includes an eccentric bearing housing 102 and a forked yoke end 104, as best illustrated FIGS. 1, 2 and 3. The connecting arm 30 with its spherical roller bearing 100 extends from the eccentric 28 to spherical rod end 110. The connecting arm 30 is disposed between the first plate, second plate, third plate, and fourth plate in the integral outboard bearing support and contained between the top plate 108 and bottom plate 109 (FIGS. 1 and 2). As seen in FIG. 2, there is ample room between the top plate 108 and the bottom plate 109 so that the connecting arm 30 can be pivoted for assembly or disassembly with a sleeve bearing 112 and secured to a spherical rod end 110 through the yoke 104. The spherical rod end 110 is designed to allow rotations relative to the connecting arm 30, preferably for plus or minus 11 degrees so that the doctor back can be moved away from its roll for cleaning or blade replacement and to allow the doctor blade wear. The spherical rod end 110 is secured to the yoke 104 with a pivot pin 112 and retained with cotter pins 116. The spherical rod end 110 is secured to the doctor back journal 32 with a lock nut 118. To reduce the amount of paper stock fillers that can reach the above described elements, the doctor back journal 32 is preferably fitted with a collar 120 and seals 122 fitted inside a sleeve 124 which is long enough to permit the necessary amount of doctor back journal 32 oscillation without forcing seals 122 out of the sleeve 124.

Figure 8:
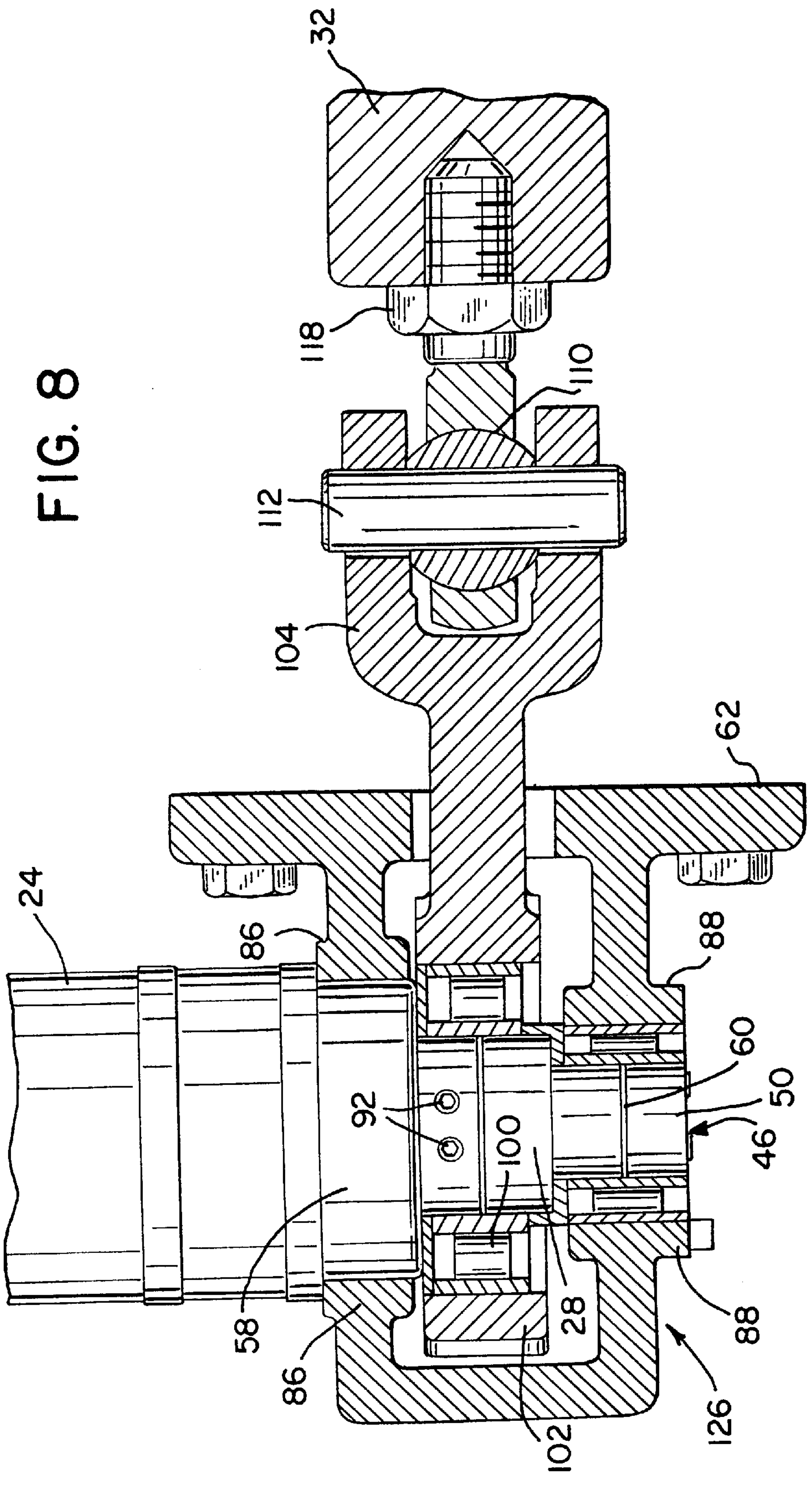
FIG. 8 is a cross-sectional view of an alternative embodiment bearing support apparatus of this invention.
Figure 10:
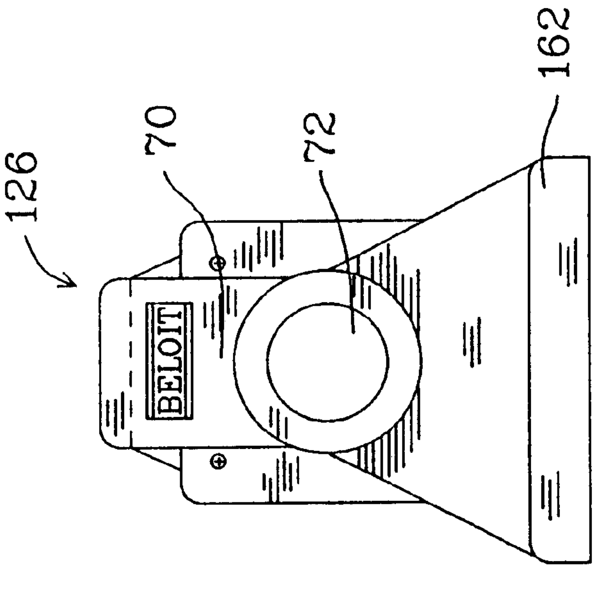
FIG. 10 is an end view of the bearing support as viewed from line 10—10 of FIG. 9.
Figure 9:
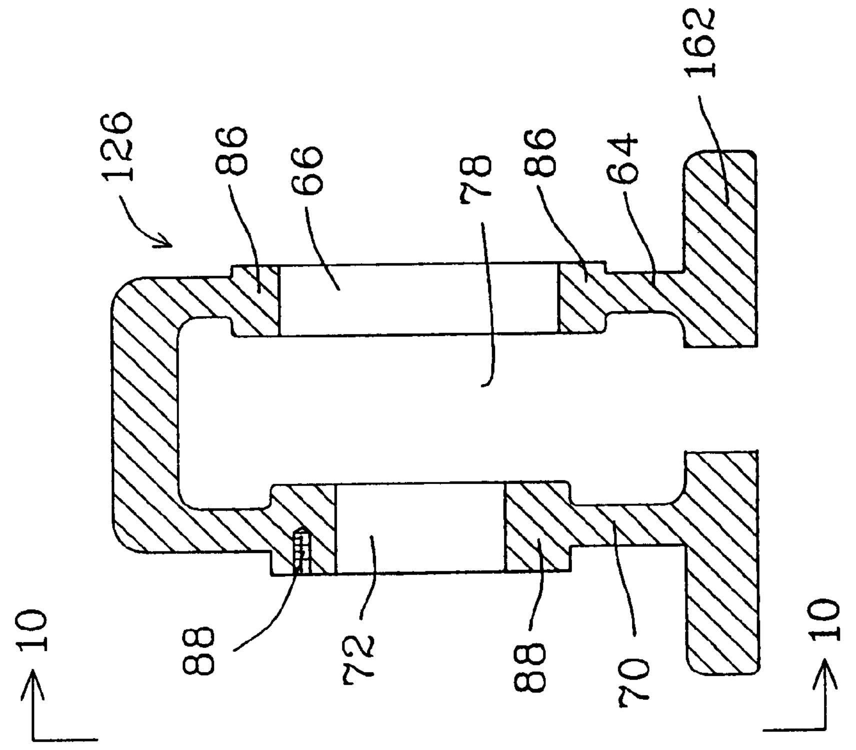
FIG. 9 is a cross-sectional view of the housing of another alternative embodiment bearing support of FIG. 10, taken along section line 9—9.

An alternate embodiment of the integral outboard bearing support 26 is shown in FIGS. 8, 9 and 10. The integral outboard bearing support 126 has a mounting plate 162 on the same side as the connecting arm exits cavity 78. The arrangement of the mounting plate 62 relative to the cavity 78 or any other component of the integral outboard bearing support 26 is immaterial so long as the distal end 50 of the output shaft 46 is adequately supported to bear the push/pull forces of the doctor back journal 32 as it oscillates.

It is understood that the invention is not limited to the particular construction and arrangement of parts herein illustrated and described, but embraces such modified forms thereof as come within the scope of the following claims.

I claim:

1. An oscillator doctor drive mechanism for a roll doctor back in a papermaking machine comprising:

a doctor back for support of a doctor blade in engagement with a papermaking roll, the doctor back having at least one axially extending journal supported for oscillatory axial motion with respect to a papermaking roll;

a motor;

a gearhead engaged and driven by the motor and having an output shaft;

a support which is fixed with respect to the papermaking roll, wherein the support has a first and a second side which are spaced from one another to define an arm-receiving cavity;

portions of the first side which define a cavity which receives the output shaft;

portions of the second side which define an opening through which the shaft extends, the gearhead being engaged with the second side;

an eccentric fixed to the shaft between the housing first side and the housing second side; and an arm which extends approximately perpendicular to the output shaft and which is connected to the doctor back journal, the arm being rotatably connected to the eccentric such that rotation of the output shaft by the motor causes the oscillatory axial movement of the doctor back with respect to the papermaking roll.

2. The apparatus of claim 1, wherein the gearhead has a housing and wherein portions of the gearhead housing extend into and are non-rotatably engaged with the opening in the support second side.

3. The apparatus of claim 1 wherein the gearhead reduces output speed of the motor.

4. The apparatus of claim 1 wherein the gearhead reduces output speed of the motor by a ratio of 300:1.

5. The apparatus of claim 2 wherein the portions of the gearhead housing form a pilot fit with the opening in the support second side.

6. The apparatus of claim 1 wherein the cavity defined by portions of the first side is axially aligned with the opening defined by the portions of the second side.

7. The apparatus of claim 1 wherein the opening defined by portions of the second side contains a bearing for rotatably receiving and supporting the output shaft.

8. The apparatus of claim 1 further comprising a roller bearing disposed in the connecting arm bore, the roller bearing rotatably receiving the eccentric.

9. The apparatus of claim 1 wherein the arm has portions defining a bore which surrounds the eccentric and further comprising a roller bearing disposed in the arm bore, the roller bearing rotatably receiving the eccentric.

* * * * *